United States Patent Office 3,746,595
Patented July 17, 1973

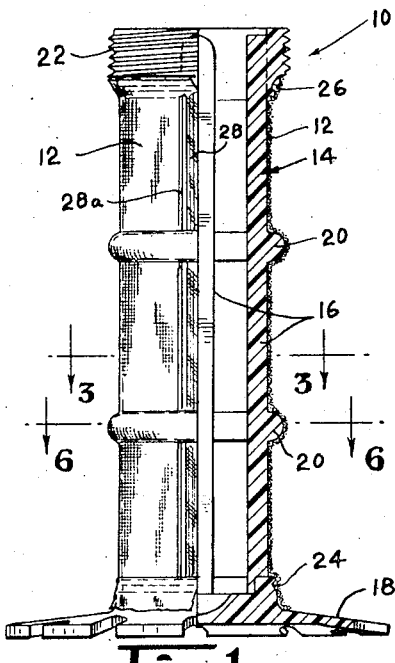
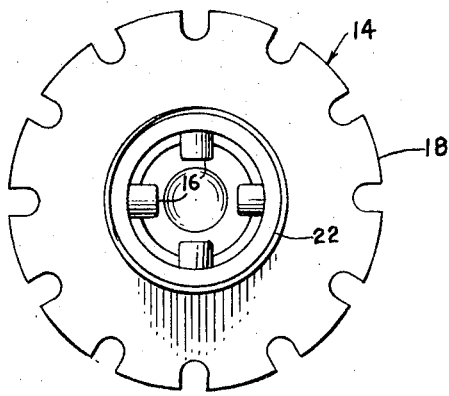
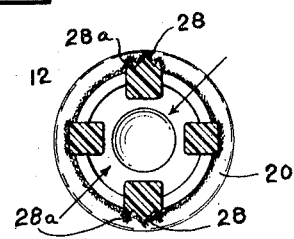
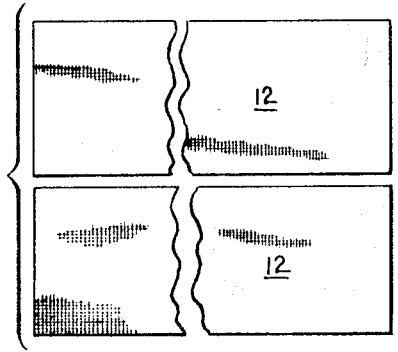
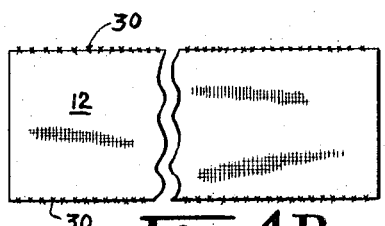
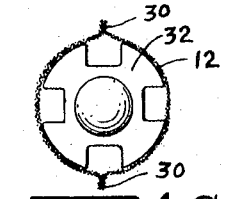
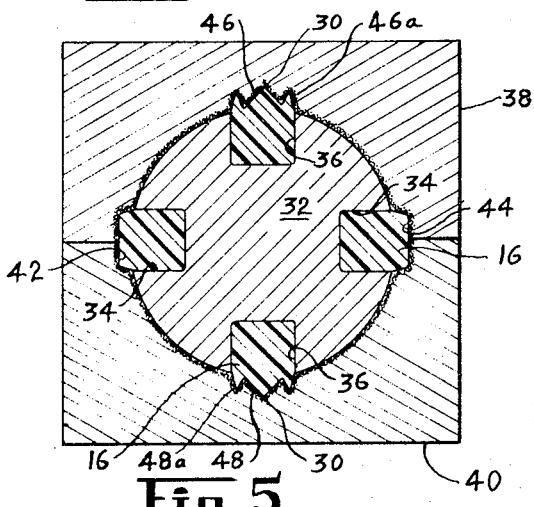
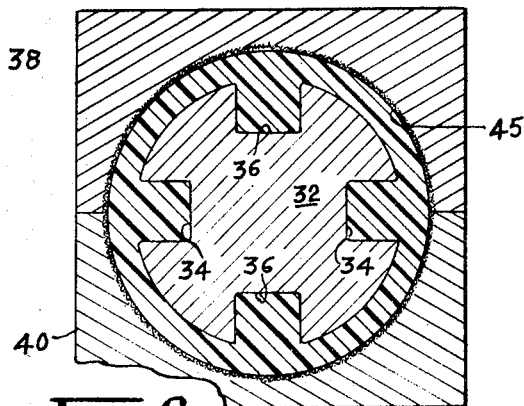
INVENTOR.
Hayden Leason
BY Dallett Hoopes
ATTORNEY.

3,746,595
METHOD OF MAKING A SELF-SUPPORTING FILTER WITH POSITIONING OF A TUBULAR SLEEVE IN A MOLD
Hayden Leason, Hebron, Ill., assignor to Scovill Manufacturing Company, Waterbury, Conn.
Filed Sept. 29, 1971, Ser. No. 184,689
Int. Cl. B29d 23/00; C09j 5/10
U.S. Cl. 156—245                                                  2 Claims

ABSTRACT OF THE DISCLOSURE

A self-supporting filter element is formed by heat-sealing longitudinal edges of woven filter material to seam together a tubular sleeve. The sleeve is placed over a male mold core having a channel precisely aligned with the seam. The male core is enclosed by a female mold cavity having a groove also aligned with the sleeve seam. Plastic is then injected into the channels to form not only a supporting rib but a reinforcement of the filter sleeve at the seam.

---

This invention relates to a process for making a self-supporting filter. More specifically, this invention relates to a process for making a filter comprising forming a woven plastic foraminous filter sleeve by heat sealing together layers along a longitudinal seam, and molding a cage structure supporting the filter sleeve.

In the prior art, there are a number of patents dealing with methods of making self-supporting filters. One such patent is U.S. 3,408,438 wherein a bat of fibrous filter material is supported by a plastic frame injection molded about the periphery of the bat. It has occasionally been desired to provide a self-supporting filter of woven foraminous material. Difficulty has been experienced in forming a sleeve of such material in that the inevitable seam line has produced a line of weakness likely to rupture during the operation of the filter. French patent 1,084,239, published Jan. 18, 1955, disclosed a method for making self-supporting foraminous filters of screen material. However, anchoring the screen seams in prior devices left much to be desired.

The present invention has for one of its objects to provide a process for making a self-supporting filter of woven foraminous material. In the process, the line of joint is forced into the apex of a V-shaped channel by the fluid plastic to be embedded in plastic and thereby held securely. Additional shallower channels adjacent the apex enhance the holding.

Further objects of the invention will be apparent from a reading of the following specification and examination of the drawings wherein:

FIG. 1 is an elevational view, partly in section, of a filter made according to the process of the invention;

FIG. 2 is a top plan view of a filter made by a process embodying the invention;

FIG. 3 is a sectional view on the line 3—3 of FIG. 1;

FIGS. 4A, 4B and 4C are reduced views showing successive steps in forming a filter sleeve during the process of the invention;

FIG. 5 is an enlarged sectional view taken about on the line 3—3 of FIG. 1 and showing the filter in the process of being made in the molding operation;

FIG. 6 is an enlarged sectional view taken on the line 6—6 of FIG. 1 also showing the filter undergoing injection molding of the frame.

Figure 7:
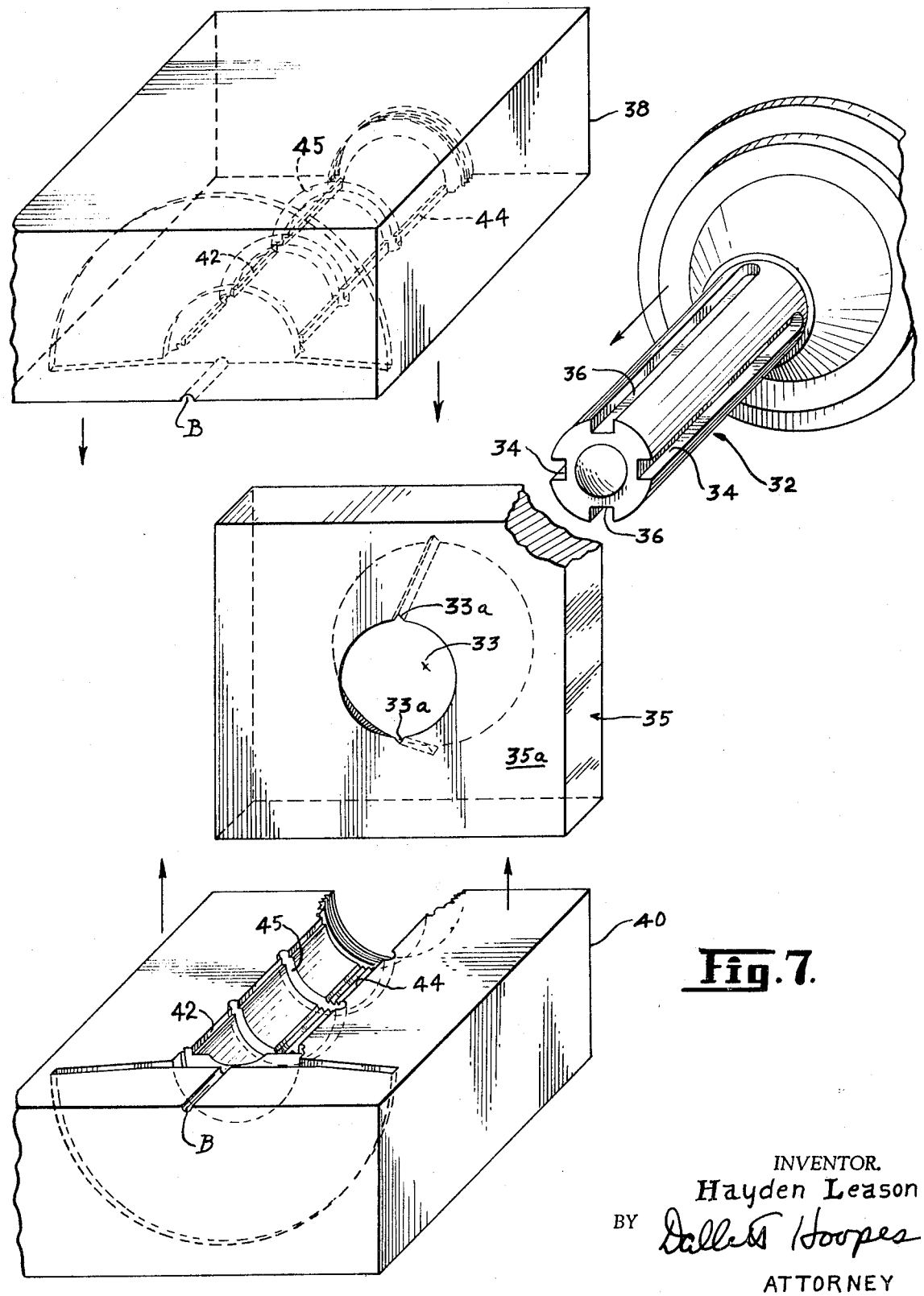
FIG. 7 is a diagrammatic view suggesting the operation of the mold parts during the molding process.

Referring more specifically to the drawings, a filter made in accordance with the invention is shown in FIG. 1 and generally designated 10. It comprises a sleeve 12 of woven foraminous plastic material. A cage 14 comprises a plurality of parallel plastic ribs 16 extending upward from a disc-shaped base 18. At spaced points above the base, rings 20 are integrally molded with the plastic ribs 16, embedding the foramious filter material on the outer surface of the plastic cage.

At its upper end, the frame or cage 14 is formed with a terminal mounting head 22 which may be externally threaded. The head is integrally molded with the longitudinal ribs 16. Both the base 18 and the head 22 have small circumferential beads 24 and 26 respectively adjacent the filter screen 12 which lock the filter media to the plastic frame.

As shown in FIG. 3, the filter screen adheres to the outside of each of the ribs 16. In the embodiment shown, two diametrically opposite ribs 16 are formed with longitudinal central pointed ridges 28 which also help lock the filter sleeve to the plastic frame. Lesser ridges 28a may enhance the locking effect. It should be noted that the screen 12 adheres to the outside of beads 24 and 26. In the embodiment shown, the longitudinal seams of the filter sleeve are disposed precisely at the point of the ridges 28. In operation, of course, the direction of the flow through the filter is from outside, as indicated by the arrows in FIG. 3. Thus, the ribs support the screen from the inside and give it considerable strength.

The forming of the sleeve screen 12 is shown in FIGS. 4A, 4B, and 4C. In the forming process, preferably two identical sheets of woven material are cut out as shown in FIG. 4A. They are superposed as shown in FIG. 4B and along parallel edges they are heat-sealed together as at 30.

The filter sleeve 12 as shown in FIG. 4C, is opened and slipped over a cylindrical mold core 32 (FIG. 7). The core is formed with longitudinal channels 34 and 36. The filter sleeve seams 30 are disposed over the core 32 in line with the longitudinal channels 36.

The core 32 is then thrust through an opening 33 in the stripper plate 35. The opening as shown is tapered in the direction toward which the core 32 moves in this operation. An important feature of the opening 33 is the provision of the V-shaped notches 33a in the opening 33. The notches are formed at the opening by the intersection of V-shaped grooves which run down the taper toward the surface 35a of the stripper plate. These notches serve to accurately position the seams 30 of the filter sleeve 12 in alignment with the center of the longitudinal channels 36.

With the core 32 thus extending through the stripper plate opening 33, the side action mold members 38 and 40 are closed around the core. With the members 38 and 40 thus closed, it may be seen that the ribs 16 of the filter cage are formed respectively (FIG. 5) from the longitudinal channels 34 and 36 in combination with the V-shaped grooves 46 and 48 which are opposite the channels 36, and the parting line grooves 42, 44. Additionally, in the preferred version the V-shaped grooves 46 and 48 in the cavities 38 and 40 are formed immediately there-adjacent with shallower grooves 46a and 48a.

With the mold thus closed, the seams 30 of the filter sleeve are disposed in the grooves 46, 48 precisely at the apex thereof respectively.

With the filter sleeve screen thus positioned in the mold, plastic material is injected thereinto to form the cage or frame structure 14 shown in FIG. 1. The plastic is preferably injected into the structure from point B to fill the channels 34, 36 in an outward direction. In this manner, the plastic pushes the screen to the outer frame surface and supports the fragile filter sleeve structure from the inside to resist the flow of fluid in the product which is from the outside in.

In the event that it is desired to use the filter product as shown in FIG. 1 with the flow from the inside toward the outside thereof, the filter screen is better positioned on the inside of each of the cage ribs 16. Accordingly, the V-shaped grooves, rather than being on the mold members 38, 40 would, for such a product, be disposed in the channels 36 to be disposed on the inside of the ribs along a V-shaped inward ridge.

Once the plastic is cured, the mold members 38, 40 may be opened and the final product may be stripped therefrom by withdrawing the core 32 outward from the stripper plate 35. It should be understood that the members 38, 40 are shown above and below the core in FIG. 7 but they are more appropriately disposed to either side thereof.

In the finished product, the fine screen of the filter is slightly penetrated by the plastic material which engages the filter material and holds it securely in place on the ribs. The seams of the filter are disposed in the apex of the ridges 28 (FIG. 3) while the lesser ridges 28a serve to enhance the locking of the screen panels in place more securely.

In practice, the woven filter material used in an embodiment has been woven filter cloth, of nylon or other polymer having five and ten micron size openings. The cage has been of glass-filled acetal resin.

Thus, there is provided, by a simple but ingenious process, a new filter screen of inexpensive nature but of unusual strength, adapted to give remarkable duration of service. The invention may be described in the following claim language.

I claim:

1. A process for making a self-supporting filter comprising the steps of:
    (a) forming a tubular sleeve from layers of woven foraminous heat sealable thermoplastic material by heat sealing said layers together in 2 parallel seams along edges of said material;
    (b) installing the sleeve over a cylindrical core having a pair of diametrically opposed longitudinal channels therealong, the seams being disposed over the channels;
    (c) passing the ensheathed core through an opening in a plate, the opening being only slightly larger than the core and having diametrically opposed pointed notches adapted to precisely align the seams with the center of the longitudinal channels;
    (d) enclosing the ensheathed core inside a female mold comprising two similar mold members together with said plate and core, said mold having a parting line longitudinal of the core, each of the mold members having V-shaped longitudinal grooves aligned respectively with the channels both sets of aligned grooves and channels being 90° removed with respect to the axis of the core from the parting line on opposite sides thereof;
    (e) injecting thermoplastic material into the channels so as to force the injected thermoplastic material outward against the foraminous material thereby urging the seams into the deepest line of the groove; and
    (f) after solidification of the injected thermoplastic material, opening the mold and stripping the filter from the core by withdrawing the core back through the opening.

2. A process as described in claim 1 wherein the V-shaped groove has a shallower groove running immediately along either side of it whereby the plastic, when partly embedded in the foraminous material in the shallower grooves, serves to more firmly hold the screen.

References Cited
UNITED STATES PATENTS

| | | | |
|---|---|---|---|
| 3,194,711 | 7/1965 | Pasternack | 156—203 X |
| 3,177,106 | 4/1965 | Seefluth et al. | 156—306 X |
| 3,318,759 | 5/1967 | Anderson | 161—249 X |
| 2,322,298 | 6/1943 | Johnston | 156—306 X |

FOREIGN PATENTS

| | | | |
|---|---|---|---|
| 1,084,239 | 1/1955 | France. | |
| 724,478 | 12/1965 | Canada | 264—257 |

OTHER REFERENCES

Randolph et al., Plastics Engineering Handbook, Reinhold, New York (1960), p. 501 relied on.

DONALD J. ARNOLD, Primary Examiner

W. E. HOAG, Assistant Examiner

U.S. Cl. X.R.

156—306; 264—251, 258, DIG. 48